United States Patent
Wakizaka

(10) Patent No.: US 9,875,014 B2
(45) Date of Patent: Jan. 23, 2018

(54) INPUT APPARATUS AND STORAGE MEDIUM STORING INPUT CONTROL PROGRAM

(75) Inventor: Masaaki Wakizaka, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 364 days.

(21) Appl. No.: 13/036,846

(22) Filed: Feb. 28, 2011

(65) Prior Publication Data

US 2011/0214057 A1 Sep. 1, 2011

(30) Foreign Application Priority Data

Feb. 26, 2010 (JP) .................................. 2010-041224

(51) Int. Cl.
G06F 3/0488 (2013.01)
G06F 3/0481 (2013.01)

(52) U.S. Cl.
CPC ........ *G06F 3/0488* (2013.01); *G06F 3/04812* (2013.01); *G06F 3/04886* (2013.01)

(58) Field of Classification Search
CPC ..... G06F 9/4443; G06F 3/0481; G06F 3/0482
USPC ........................................ 715/702, 808, 788
See application file for complete search history.

(56) References Cited

U.S. PATENT DOCUMENTS

| 8,015,509 | B2* | 9/2011 | Karstens | ............... | G06F 3/0481 715/764 |
| 8,471,825 | B2* | 6/2013 | Miyazaki | ............ | G06F 3/04886 345/156 |
| 2001/0004424 | A1 | 6/2001 | Mutoh et al. | | |
| 2001/0006382 | A1 | 7/2001 | Sevat | | |
| 2005/0125742 | A1* | 6/2005 | Grotjohn | ............... | G06F 3/0481 715/799 |
| 2006/0101344 | A1 | 5/2006 | Tabata | | |
| 2006/0274362 | A1 | 12/2006 | Kita | | |
| 2007/0192734 | A1* | 8/2007 | Berstis et al. | ................ | 715/808 |
| 2010/0011318 | A1* | 1/2010 | Nakada et al. | ............... | 715/808 |
| 2010/0156808 | A1* | 6/2010 | Stallings et al. | .............. | 345/173 |

(Continued)

FOREIGN PATENT DOCUMENTS

| JP | 2001-169039 A | 6/2001 |
| JP | 2003-518831 A | 6/2003 |
| JP | 2004-094394 A | 3/2004 |

(Continued)

*Primary Examiner* — Christopher J Fibbi
(74) *Attorney, Agent, or Firm* — Baker Botts L.L.P.

(57) ABSTRACT

An input apparatus including: a display device on which at least one operational image is displayed; a selected image determining section which determines, as a selected image, an operational image displayed at a position designated by an input operation; and a display updating section which updates a display from a first operational screen to a second operational screen where a display update condition has been satisfied, and which includes: a position specifying section which, where the input operation has been performed or expected to be performed within a period after the satisfaction of the display update condition and before the update, specify one of positions designated by the input operation and expected to be designated by the input operation; and an image arranging section which arranges the at least one operational image on the second operational screen after the update so as to avoid the specified position.

13 Claims, 7 Drawing Sheets

(56) References Cited

U.S. PATENT DOCUMENTS

| | | | |
|---|---|---|---|
| 2010/0185989 A1* | 7/2010 | Shiplacoff et al. | 715/856 |
| 2011/0148776 A1* | 6/2011 | Hautala | 345/173 |

FOREIGN PATENT DOCUMENTS

| | | | |
|---|---|---|---|
| JP | 2006-084922 A | 3/2006 | |
| JP | 2006-135780 A | 5/2006 | |
| JP | 2006-340259 A | 12/2006 | |
| JP | 2008-310521 A | 12/2008 | |
| JP | 2008-310522 A | 12/2008 | |
| JP | 2009-037343 A | 2/2009 | |
| JP | 2009-037344 A | 2/2009 | |

* cited by examiner

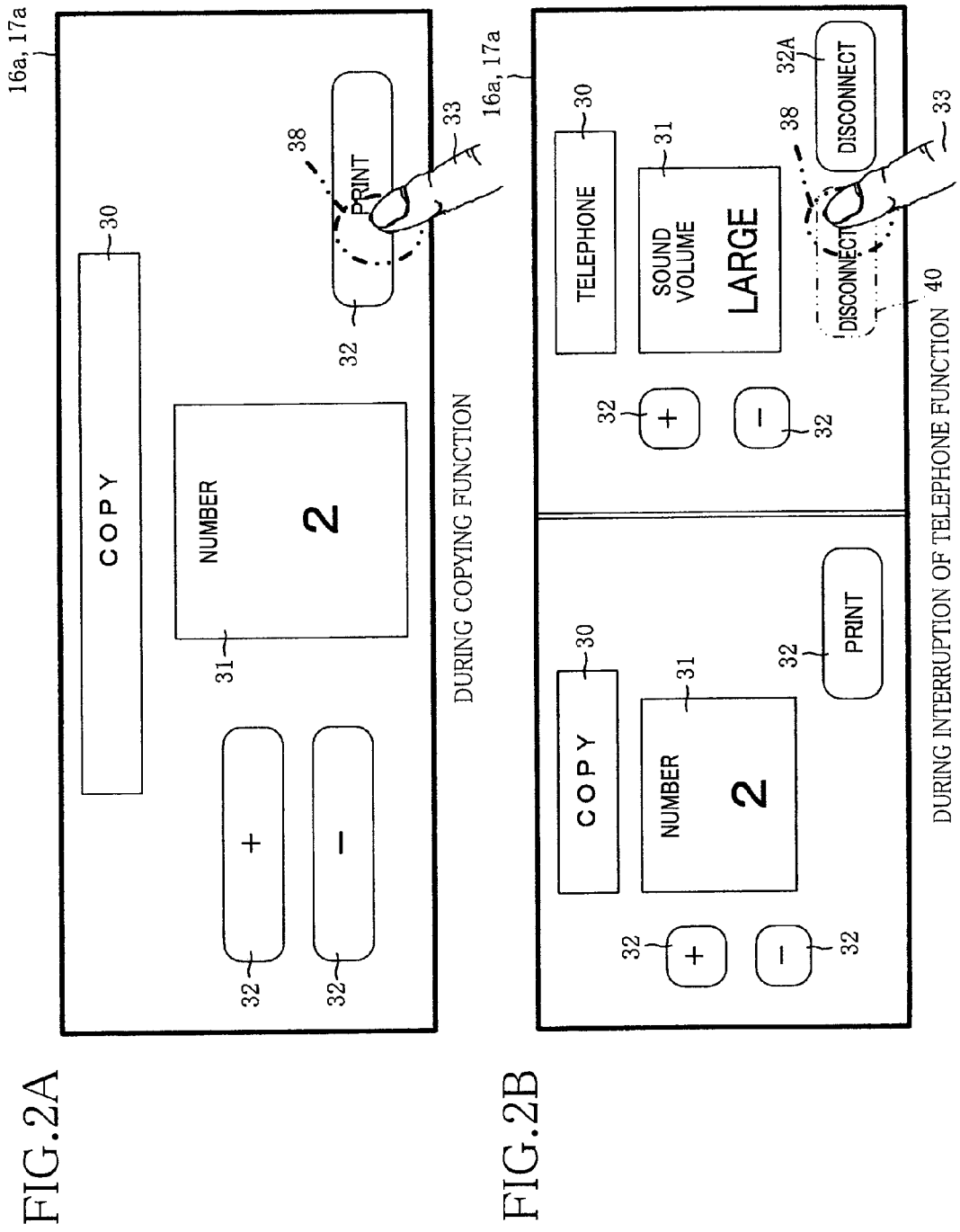

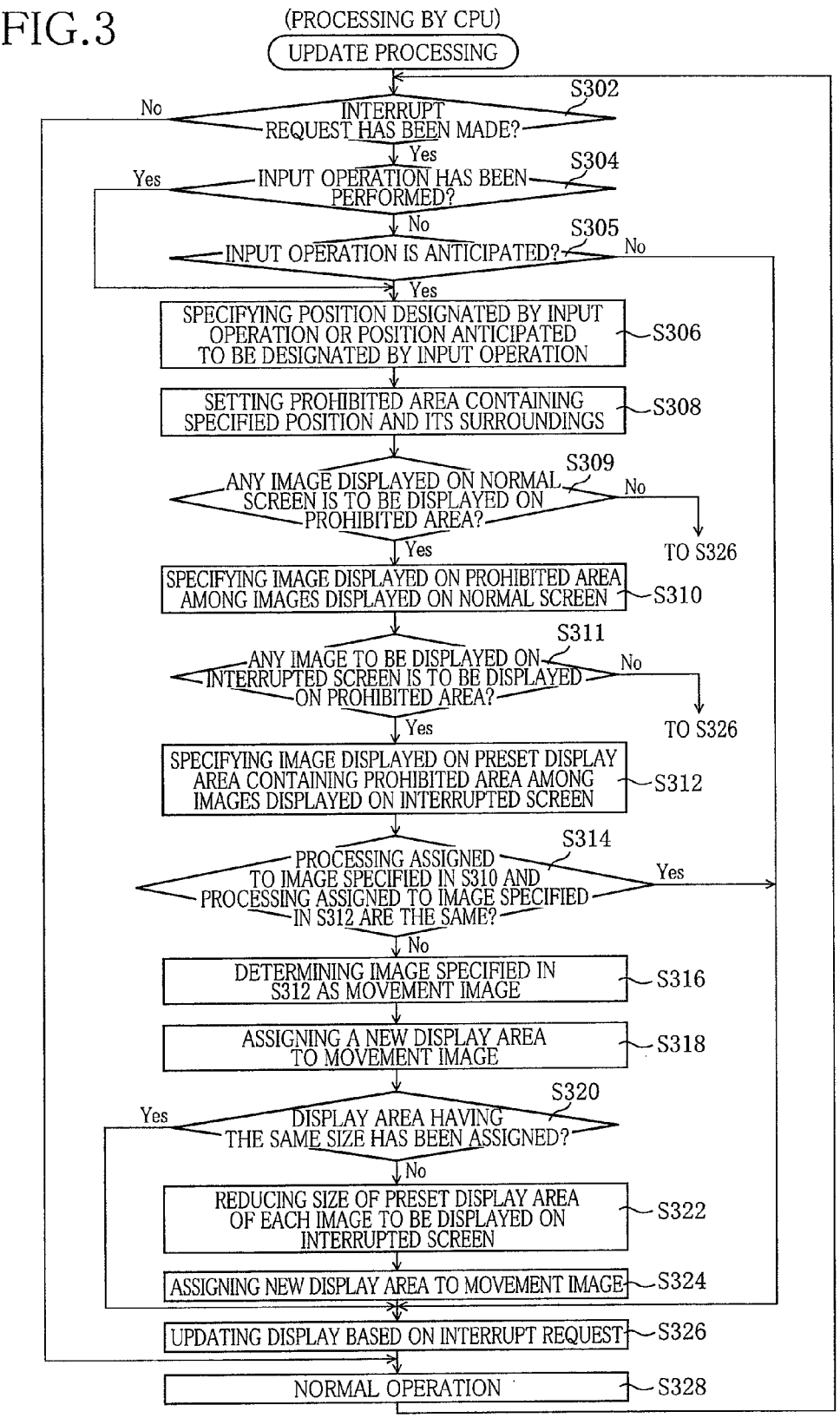

INPUT APPARATUS AND STORAGE MEDIUM STORING INPUT CONTROL PROGRAM

CROSS REFERENCE TO RELATED APPLICATION

The present application claims priority from Japanese Patent Application No. 2010-041224, which was filed on Feb. 26, 2010, the disclosure of which is herein incorporated by reference in its entirety.

BACKGROUND OF THE INVENTION

Field of the Invention

The present invention relates to an input apparatus and a storage medium storing an input control program.

Description of the Related Art

A pop-up window may be automatically displayed on a front side of a display when a user views a web page using an internet, when a specific time has been reached, or when a certain page has been opened.

SUMMARY OF THE INVENTION

However, when a pop-up window has been suddenly displayed where a user intends to perform some operation, there is a problem that the user is likely to make an operating error. For example, when a pop-up window has been suddenly displayed at a position designated by a cursor just before a user clicks a mouse button in a state in which the cursor is located on the position on a screen, the user may click the mouse button by excessive motion. This may cause operating errors such as an error in which the user closes the displayed pop-up window against a user's intention or an error in which a processing unintended by the user is performed.

Such operating errors may be caused also in various cases other than the case where the user is viewing the web page. For example, where a dialog box has been suddenly displayed while the user is using a personal computer, or where, when the user is going to perform a copying in a multi-function apparatus, an incoming call has arrived from an external device and then a display manner of an operating panel has suddenly changed from a copying mode to a telephone mode, the user may inadvertently perform an unintended input without noticing the update of the display.

This invention has been developed in view of the above-described situations, and it is an object of the present invention to provide an input apparatus and a storage medium storing an input control program which can prevent an operating error even where a timing of an update of a display on a display panel and a timing of an input operation of a user coincide with each other.

The object indicated above may be achieved according to the present invention which provides an input apparatus comprising: a display device including a display face on which at least one operational image is displayed; a selected image determining section configured to determine, as a selected image, an operational image displayed at a position designated by an input operation on the display face; and a display updating section configured to update a display on the display face from a first operational screen to a second operational screen where a predetermined display update condition has been satisfied, the display updating section including: a position specifying section configured to, where the input operation has been performed or expected to be performed within a period after the display update condition has been satisfied and before the update of the display by the display updating section, specify one of a position designated by the input operation and a position expected to be designated by the input operation; and an image arranging section configured to arrange the at least one operational image on the second operational screen after the update by the display updating section so as to avoid the position specified by the position specifying section.

The object indicated above may also be achieved according to the present invention which provides a storage medium storing an input control program executed by an inputting apparatus, the input control program comprising: displaying at least one operational image; determining, as a selected image, an operational image displayed at a position designated by an input operation on a display face on which the at least one operational image is displayed; updating a display on the display face from a first operational screen to a second operational screen where a predetermined display update condition has been satisfied; specifying, where the input operation has been performed or expected to be performed within a period after the display update condition has been satisfied and before the update of the display by the display updating section, one of a position designated by the input operation and a position expected to be designated by the input operation; and updating, where one of the position designated by the input operation and the position expected to be designated by the input operation has been specified, the display by arranging the at least one operational image on the second operational screen after the update so as to avoid the specified position.

BRIEF DESCRIPTION OF THE DRAWINGS

The objects, features, advantages, and technical and industrial significance of the present invention will be better understood by reading the following detailed description of an embodiment of the invention, when considered in connection with the accompanying drawings, in which:

FIG. 2A is a view showing an example of a normal screen displayed on a display panel of an LCD, and FIG. 2B is a view showing an example of an interrupted screen displayed on the display panel of the LCD;

FIG. 3 is a flow-chart showing an update processing executed by a CPU of the MFP;

DESCRIPTION OF THE EMBODIMENT

Hereinafter, there will be described an embodiment of the present invention by reference to the drawings.

Figure 1:
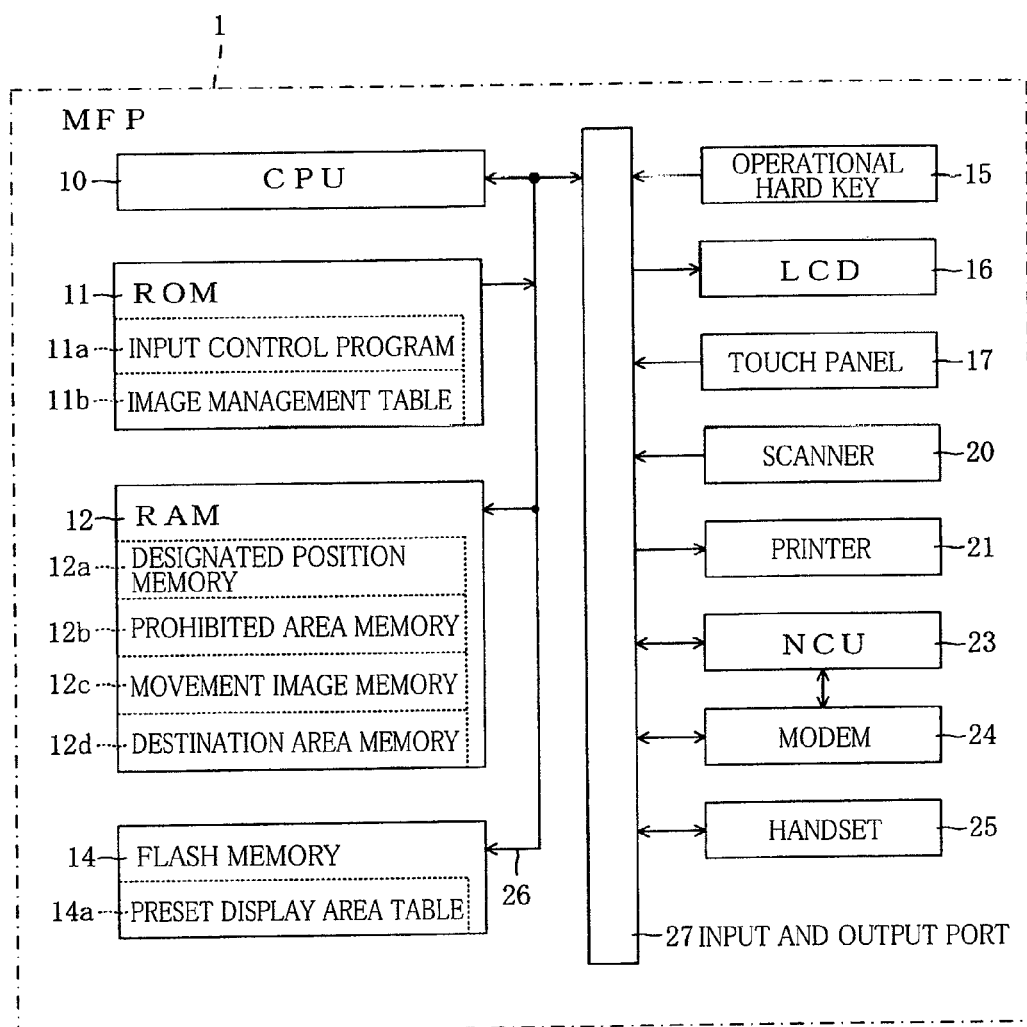
FIG. 1 is a block diagram showing an electric construction of an MFP as an embodiment of the present invention.

As shown in FIG. 1, a Multi Function Peripheral (MFP) 1 has various functions such as a copying function, a facsimile function, a scanning function, a telephone function, and a printing function. As will be explained later in detail with reference to FIGS. 2A and 2B, a plurality of images or items 32 functioning as operational images are displayed on an LCD 16 of the MFP 1. Where a user has touched or pressed a display panel 16a as a display face of the LCD 16 (hereinafter may be referred to as an "input operation"), the MFP 1 determines, as a selected image, one of the images 32 which is displayed on a position touched or designated by the input operation, and then the MFP 1 executes a processing assigned in advance to the selected image.

In particular, the MFP 1 as the present embodiment is configured such that even where a timing of an update of a display on the display panel 16a and a timing of the input operation of the user coincide with each other, it is possible to prevent that an image 32 unintended by the user is determined as the selected image. Hereinafter, this MFP 1 will be explained in more detail.

The MFP 1 mainly includes a CPU 10, a ROM 11, a RAM 12, a flash memory 14, operational hard keys 15, the LCD 16, a touch panel 17, a scanner 20, a printer 21, an NCU 23, a modem 24, and a handset 25. The CPU 10, the ROM 11, the RAM 12, and the flash memory 14 are connected to one another via a bus line 26. The operational hard keys 15, the LCD 16, the touch panel 17, the scanner 20, the printer 21, the NCU 23, the modem 24, the handset 25, and the bus line 26 are connected to one another via an input and output port 27.

The CPU 10 is configured to control the various functions of the MFP 1 and the various portions of the MFP 1 which are connected to the input and output port 27, in accordance with fixed values and programs stored in the ROM 11, the RAM 12, or the flash memory 14 or in accordance with various signals transmitted and received via the NCU 23.

The ROM 11 is an unrewritable memory which stores, e.g., an input control program 11a and an image management table 11b. The CPU 10 executes an update processing (with reference to FIG. 3) which will be described below, in accordance with the input control program 11a. The image management table 11b is a table storing a correspondence between each of the images 32 (with reference to FIGS. 2A and 2B) displayed on the LCD 16 and a corresponding one of processings which has been assigned in advance to each image 32. The images 32 will be explained below with reference to FIGS. 2A and 2B.

The RAM 12 is a rewritable volatile memory including a designated position memory 12a, a prohibited area memory 12b, a movement image memory 12c, and a destination area memory 12d. The designated position memory 12a is a memory which stores a position touched or designated, or a position to be touched or designated (i.e., a position at which detection of the touch is expected or predicted) by the input operation. A position stored by the designated position memory 12a will be explained below with reference to FIGS. 2A and 2B.

The prohibited area memory 12b is a memory which stores a prohibited area 38 which will be explained below with reference to FIGS. 2A and 2B. When the MFP 1 updates the display on the LCD 16, the MFP 1 arranges the images 32 so as to avoid the prohibited area 38 set in the prohibited area memory 12b, that is, the MFP 1 arranges the images 32 such that no images 32 overlap with the prohibited area 38.

The movement image memory 12c is a memory which stores one of the images 32 displayed on the LCD 16, which one is to be displayed at an area different from a display area set in advance (hereinafter may be referred to as a "preset display area"). That is, the one image 32 is moved from the preset display area and displayed (hereinafter may be referred to as a movement image 32A). The destination area memory 12d is a memory which stores a display area newly assigned to the movement image 32A.

The flash memory 14 is a rewritable nonvolatile memory including a preset display area table 14a. The preset display area table 14a stores preset display areas respectively preset for or assigned to the images 32. The user can freely set the preset display areas of the respective images 32 and store the preset display areas into the preset display area table 14a. It is noted that, as will be explained in detail later with reference to FIGS. 2A and 2B, the MFP 1 as the present embodiment updates the display on the LCD 16 from a normal screen as a first operational screen (with reference to FIG. 2A) to an interrupted screen as a second operational screen (with reference to FIG. 2B) upon an occurrence of an interrupt request. For each of the images displayed on both of the normal screen and the interrupted screen, two types of the preset display areas, namely, the preset display area on the normal screen and the preset display area on the interrupted screen are set in advance in the preset display area table 14a.

Each of the operational hard keys 15 is a hard key for inputting a command to the MFP 1. The LCD 16 is a liquid crystal display as a display device including a display panel 16a (with reference to FIGS. 2A and 2B) and configured to display various images on the display panel 16a.

The touch panel 17 includes a detecting area 17a (with reference to FIGS. 2A and 2B) superposed on the display panel 16a. An entire area of the detecting area 17a is finely divided in a lattice shape into unit areas in each of which an electrostatic sensor is provided. Thus, when an input object such as a user's finger or a pen has touched or approached the detection area 17a, the touch or approach can be detected by the electrostatic sensor(s) each in a corresponding one of the unit areas. Coordinates information (an x coordinate and a y coordinate) is brought into correspondence with each unit area in the detecting area 17a on the basis of a coordination system in which a left top of the touch panel 17 is defined as an origin point, a rightward direction is defined as an X-direction, and a downward direction is defined as a Y-direction. The touch panel 17 outputs the coordinates information of the electrostatic sensor which has detected the touch or approach of the input object.

It is noted that the touch panel 17 may be superposed or overlaid on an upper face of the display panel 16a of the LCD 16 so as to be held in close contact with the upper face. Alternatively, a space may be formed between the touch panel 17 and the upper face of the display panel 16a, or the touch panel 17 may be superposed on the display panel 16a with, e.g., a transparency film interposed therebetween.

The scanner 20 is configured to read a document in the facsimile function, the scanning function, or the copying function. The printer 21 is configured to record an image on a recording sheet. The NCU 23 is configured to control a telephone line. The modem 24 is configured to, in transmission of the facsimile, modulate a transmission signal to a form suitable for the transmission in the telephone line, and in receiving of the facsimile, demodulate the modulated signal transmitted from the telephone line. The handset 25 is for the user to make a conversation with an external device.

There will be next explained displays on the display panel 16a with reference to FIGS. 2A and 2B. As shown in FIG. 2A, a single display screen to which a single function is assigned is displayed on an entire area of the display panel 16a, and such a display will be hereinafter referred to as a "normal screen". Further, as shown in FIG. 2B, the entire area of the display panel 16a is split into two areas to which different functions are respectively assigned, and such a display will be hereinafter referred to as an "interrupted screen".

As shown in FIG. 2A, function display information 30 showing a function being currently selected, set value information 31 showing a set value, and the images 32 are displayed on the normal screen. As described above, the detecting area 17a of the touch panel 17 is superposed on the display panel 16a. Thus, where the user has performed an input operation in which the user has touched or pressed the display panel 16a with an input object 33, the touch panel 17 detects a position touched or designated by the input operation.

It is noted that, during the display of the normal screen, each of the images 32 is displayed on a corresponding one of the preset display areas set in advance in the preset display area table 14a. Thus, the MFP 1 specifies one of the images 32 which has been selected by the input operation of the user, on the basis of a position detected by the touch panel 17 and the respective preset display areas of the images 32, and then the MFP 1 determines the specified image 32 as the selected image. Then, the MFP 1 executes a processing assigned in advance to the image 32 determined as the selected image.

An arrangement of the images 32 is changed where an interrupt request of a function different from a function being selected has been made during the display of the normal screen shown in FIG. 2A, and thereby the display is updated from the normal screen to the interrupted screen as shown in FIG. 2B. Thus, there is a possibility that the user erroneously touches an unintended one of the images 32 without noticing the update of the display of the display panel 16a or by excessive motion even though the user has noticed the update of the display.

Thus, where the input operation has been performed after the occurrence of the interrupt request and before the update of the display, or where the input operation is expected to be performed, the MFP 1 arranges the images 32 on the interrupted screen after the update of the display such that the images 32 do not overlap with a position designated by the input operation or a position at which the designation by the input operation is expected.

As an example, there will be explained, with reference to FIG. 2A, a case where the interrupt request has been made just before the user has touched one of the images 32 to which a processing for starting the recording is assigned. In this case, the MFP 1 as the present embodiment sets an area including a position the user is going to touch as the prohibited area 38 and stores the area into the prohibited area memory 12b (with reference to FIG. 1). Then, as shown in FIG. 2B, the MFP 1 arranges the images 32 so as to avoid the prohibited area 38 on the interrupted screen after the update of the display.

Where the MFP 1 changes the display in this manner, even if the user has unintentionally touched the display panel 16a with the input object 33 without noticing the update of the display or by excessive motion, no images 32 are disposed at the touched position after the update of the display. Thus, even where the timing of the update of the display on the display panel 16a and the timing of the input operation of the user coincide with each other, it is possible to prevent that the image 32 unintended by the user is determined as the selected image.

More specifically explained, the MFP 1 determines, as the movement image 32A, an image 32 to be displayed on a preset display area 40 including at least a part of the prohibited area 38 among the images 32 to be displayed on the interrupted screen after the update of the display, and then the MFP 1 stores the determined image 32 into the movement image memory 12c (with reference to FIG. 1). For example, in an example shown in FIG. 2B, the preset display area 40 of the image 32 to which a processing for disconnecting a conversation is assigned includes a part of the prohibited area 38. Accordingly, in this case, the MFP 1 determines the images 32 as the movement image 32A. Then, the MFP 1 assigns a new display area to the movement image 32A such that the new display area avoids or does not overlap with the prohibited area 38, and displays the movement image 32A on the newly assigned display area on the interrupted screen after the update of the display.

Meanwhile, the MFP 1 displays the images 32 other than the movement image 32A on the respective corresponding preset display areas set in advance in the preset display area table 14a. That is, among the images 32 to be displayed on the interrupted screen after the update of the display, the MFP 1 displays only the image 32 having a high possibility to be inadvertently designated, as the movement image 32A on a display area different from a display area at which the image 32 is originally planned to be displayed. Where the MFP 1 displays the images 32 in this manner, the arrangement of the images 32 is not greatly changed, thereby making it possible to give the user less feeling of strangeness and to display the images 32 on the respective preset display areas set in advance by the user as many as possible.

It is noted that the case where the input operation is expected to be performed includes two cases in the MFP 1 as the present embodiment.

A first case is a case where the input object 33 is approaching the display panel 16a. When the input object 33 is approaching the display panel 16a, the MFP 1 can expect that the user intends to perform the input operation. In the present embodiment, the touch panel 17 can detect a position the input object 33 is approaching. Thus, when the approach of the input object 33 has been detected by the touch panel 17, the MFP 1 specifies the approach position as a position expected to be designated by the input operation and stores the specified position into the designated position memory 12a (with reference to FIG. 1).

A second case is a case where the display panel 16a is being successively touched or pressed by the input object 33 within a predetermined successive designation period, that is, the input operation is being successively performed. For example, where the image 32 for changing a set value of a "NUMBER" (a copy number) is being successively touched, the MFP 1 can expect that the user intends to greatly change the set value. Thus, even after the interrupt request has been made, the user may touch the same position or a position there near without noticing the interrupt request or by excessive motion. Accordingly, where the interrupt request has been made while the input operation for designating the same image 32 is being successively performed, the MFP 1 specifies a position designated by one of the successive input operations that has been most recently performed (i.e., the last input operation) as a position expected to be designated by the input operation, and stores the specified position into the designated position memory 12a.

There will be next explained the update processing executed by the CPU 10 of the MFP 1 with reference to a flow-chart shown in FIG. 3. This update processing is a processing for updating the display of the display panel 16a from the normal screen to the interrupted screen when the interrupt request has been made.

Initially in S302, the CPU 10 judges whether the interrupt request has been made or not. Where the CPU 10 has judged that the interrupt request has not been made (S302: No), the CPU 10 performs in S328 a normal operation, and this update processing returns to S302. It is noted that the normal operation is an operation in which where the user has performed the input operation to determine a certain image 32 as the selected image, the CPU 10 executes a processing assigned in advance to the image 32, for example. Further, the wording "to determine a certain image 32 as the selected image" means that where a position touched by the user having performed the input operation on the display panel 16a is located in the display area of the image 32, the image 32 is determined as the selected image.

On the other hand, where the CPU 10 has judged that the interrupt request has been made (S302: Yes), the CPU 10 judges in S304 whether the input operation has been performed or not. Specifically, the CPU 10 judges whether the touch of the input object 33 on the display panel 16a has been detected or not. Where the CPU 10 has judged that the input operation has not been performed (S304: No), the CPU 10 judges in S305 whether the input operation has been expected or not. Specifically, the CPU 10 judges whether the approach of the input object 33 has detected or not or whether the interrupt request has been made or not in the case where the input operation is successively performed and the same image 32 is successively determined as the selected image.

Where the CPU 10 has made negative decisions in the judgments in S304 and S305 (S304, S305: No), that is, where the input operation has been neither performed nor expected after the interrupt request has been made, the CPU 10 performs in S326 the update of the display on the basis of the interrupt request. In this case, the images 32 are displayed on the respective preset display areas after the update of the display. Then in S328, the CPU 10 performs the normal operation, and this update processing returns to S302.

On the other hand, the CPU 10 has made an affirmative decision in the judgment in S304 or S305 (S304 or S305: Yes), that is, where the input operation has been performed or expected to be performed before the update of the display after the interrupt request, the CPU 10 specifies in S306 a position designated by the input operation or a position expected to be designated by the input operation and stores the specified position into the designated position memory 12a.

As described above, the entire area of the detecting area 17a of the touch panel 17 is divided in the lattice shape into the unit areas in each of which the electrostatic sensor is provided. Thus, the CPU 10 specifies a position of the electrostatic sensor having detected the touch or approach on the basis of the output from the touch panel 17 and stores the specified position into the designated position memory 12a. Further, when the CPU 10 has judged that the interrupt request has been made in the case where the input operation is successively performed and the same image 32 is successively determined as the selected image, the CPU 10 specifies a position of the electrostatic sensor having detected the touch based on one of the successive input operations that has been most recently performed and stores the specified position into the designated position memory 12a.

Then in S308, the CPU 10 sets an area including the specified position and its surroundings as the prohibited area 38 and stores the set area into the prohibited area memory 12b. Here, the word "surroundings" means an area including positions of some electrostatic sensors (ranging from two to five, for example) around the position stored in the designated position memory 12a. It is noted that, in the present embodiment, the area including the surroundings of the specified position is set as the prohibited area 38, but the present invention is not limited to this configuration. That is, this MFP 1 may be configured such that an area constituted only by the specified position (i.e., an area constituted only by the position stored in the designated position memory 12a) as the prohibited area 38.

Then in S309, the CPU 10 judges whether at least one of the images 32 displayed on the normal screen before the update of the display is to be displayed on the prohibited area 38 or not. For example, the judgment in S309 is performed on the basis of whether at least a part of a display area of at least one of the images 32 displayed on the normal screen before the update is overlaid on or overlaps with the prohibited area 38 or not. Where the CPU 10 has judged that at least one of the images 32 displayed on the normal screen before the update of the display is to be displayed on the prohibited area 38 (S309: Yes), this update processing goes to S310. On the other hand, where the CPU 10 has judged that at least one of the images 32 displayed on the normal screen before the update of the display is not to be displayed on the prohibited area 38 (S309: No), the CPU 10 performs in S326 the update of the display on the basis of the interrupt request. In S310, the CPU 10 specifies the image 32 to be displayed on the prohibited area 38 among the images 32 displayed on the normal screen before the update of the display. For example, in the case of the normal screen shown in FIG. 2A, one of the images 32 to which the processing for starting the recording is assigned is specified as the image 32 displayed on the prohibited area 38.

Then in S311, the CPU 10 judges whether at least one of the images 32 to be displayed on the interrupted screen after the update of the display is to be displayed on the prohibited area 38 or not. For example, the judgment in S311 is performed on the basis of whether at least a part of a display area of at least one of the images 32 to be displayed on the interrupted screen after the update is overlaid on or overlaps with the prohibited area 38 or not. Where the CPU 10 has judged that at least one of the images 32 to be displayed on the interrupted screen after the update of the display is to be displayed on the prohibited area 38 (S311: Yes), this update processing goes to S312. On the other hand, where the CPU 10 has judged that at least one of the images 32 to be displayed on the interrupted screen after the update of the display is not to be displayed on the prohibited area 38 (S311: No), the CPU 10 performs in S326 the update of the display on the basis of the interrupt request. In S312, the CPU 10 specifies the image 32 displayed on the preset display area 40 including at least a part of the prohibited area 38 among the images 32 displayed on the interrupted screen after the update of the display.

Then in S314, the CPU 10 judges whether a processing assigned in advance to the image 32 specified in S310 and a processing assigned in advance to the image 32 specified in S312 are the same as each other or not. Where these processings are the same as each other (S314: Yes), this update processing goes to S326 in which the CPU 10 performs the update of the display on the basis of the interrupt request. That is, the images 32 are displayed on the respective preset display areas. In this configuration, where the image 32 displayed on the position designated by the input operation or the position expected to be designated by the input operation is the same or not changed before and after the update of the display, the display areas of the respective images 32 displayed on the display panel 16a are not changed, which never gives the user the feeling of strangeness. Further, the images 32 can be arranged on the respective preset display areas set in advance by the user.

On the other hand, where the CPU 10 has made a negative decision in the judgment in S314 (S314: No), the CPU 10 determines in S316 the image 32 specified in S312 as the movement image 32A. That is, the CPU 10 determines the movement image 32A on condition that the processing assigned in advance to the image 32 specified in S310 and the processing assigned in advance to the image 32 specified in S312 are different from each other. Accordingly, the image 32 having a possibility that a processing unintended by the user is performed if the image 32 is designated is determined as the movement image 32A among the images 32 displayed on the interrupted screen after the update of the display.

Then in S318, the CPU 10 assigns a new display area to the determined movement image 32A so as to avoid the prohibited area 38 and the preset display areas of the other images 32 to be displayed on the interrupted screen. It is noted that the wording "assigns a new display area to the determined movement image 32A so as to avoid the prohibited area 38 and the preset display areas of the other images 32 to be displayed on the interrupted screen" means to assign a new display area to the determined movement image 32A such that the display area of the movement image 32A does not overlap with the prohibited area 38 and the preset display areas of the other images 32 to be displayed on the interrupted screen.

It is noted that when the CPU 10 assigns the new display area to the movement image 32A in S318, the CPU 10 assigns a display area having the same area (size) and shape as those of the preset display area 40 of the movement image 32A. Further, the CPU 10 assigns the new display area to the movement image 32A such that a positional relationship between the display area newly assigned to the movement image 32A and the images 32 other than the movement image 32A maintains a positional relationship between the preset display area 40 of the movement image 32A and the images 32 other than the movement image 32A.

Specifically, the CPU 10 initially judges on which side of the movement image 32A the images 32 other than the movement image 32A are located. For example, in the example shown in FIG. 2B, all the images 32 other than the movement image 32A are located on an upper left side of the preset display area 40 of the movement image 32A. Thus, in order to maintain this positional relationship, the CPU 10 assigns a display area located on a lower right side of the other images 32 to the movement image 32A. Accordingly, a positional relationship among the images 32 is maintained on the interrupted screen, thereby preventing that the feeling of strangeness is given to the user. It is noted that the wording "a positional relationship among the images 32 is maintained on the interrupted screen" means that a new display area is assigned to the movement image 32A such that where an upward and downward direction and a rightward and leftward direction are defined on the interrupted screen, at least one of (a) an upward-and-downward positional relationship in the upward and downward direction between the display area newly assigned to the movement image 32A and the respective display areas of the images 32 other than the movement image 32A on the interrupted screen and (b) a rightward-and-leftward positional relationship therebetween in the rightward and leftward direction coincides with at least one of (a) an upward-and-downward positional relationship in the upward and downward direction between the preset display area of the movement image 32A and the respective display areas of the images 32 other than the movement image 32A on the interrupted screen and (b) a rightward-and-leftward positional relationship therebetween in the rightward and leftward direction.

The explanation of the flow of the update processing is restarted with reference to FIG. 3. In S320, the CPU 10 judges whether or not the CPU 10 has assigned, to the movement image 32A, a display area not including the prohibited area 38 or the preset display areas of the other images 32 and having the same area (size) as that of the preset display area 40 of the movement image 32A.

Where the CPU 10 has made an affirmative decision in the judgment in S320 (S320: Yes), the CPU 10 updates the display on the basis of the interrupt request in S326. In this update, the movement image 32A is displayed not on the preset display area 40 but on the display area newly assigned on the interrupted screen after the update of the display. Then in S328, the CPU 10 performs the normal operation. For example, where the user has performed the input operation to determine a certain image 32 as the selected image, the CPU 10 executes a processing assigned in advance to the image 32.

On the other hand, where the CPU 10 has made a negative decision in the judgment in S320 (S320: No), the CPU 10 reduces in S322 sizes of the preset display areas on the respective images 32 to be displayed on the interrupted screen. Specifically, the CPU 10 sets again the preset display area of each image 32 set in the preset display area table 14a to a smaller area.

Then in S324, the CPU 10 assigns a display area again to the movement image 32A on the basis of the preset display areas resized in S322. It is noted that any display area may be assigned to the movement image 32A in S324 as long as the display area does not overlap with the prohibited area 38 and the respective preset display areas of the other images 32. For example, an area having a smaller size than that of the preset display area 40 of the movement image 32A may be used as the display area. Then in S326, the CPU 10 updates the display on the display panel 16a to the interrupted screen and performs in S328 the normal operation, and this update processing returns to S302. In this case, each image 32 to be displayed on the interrupted screen is to be displayed so as to have a size smaller than that of the preset display area set in advance by the user.

Figure 4A:
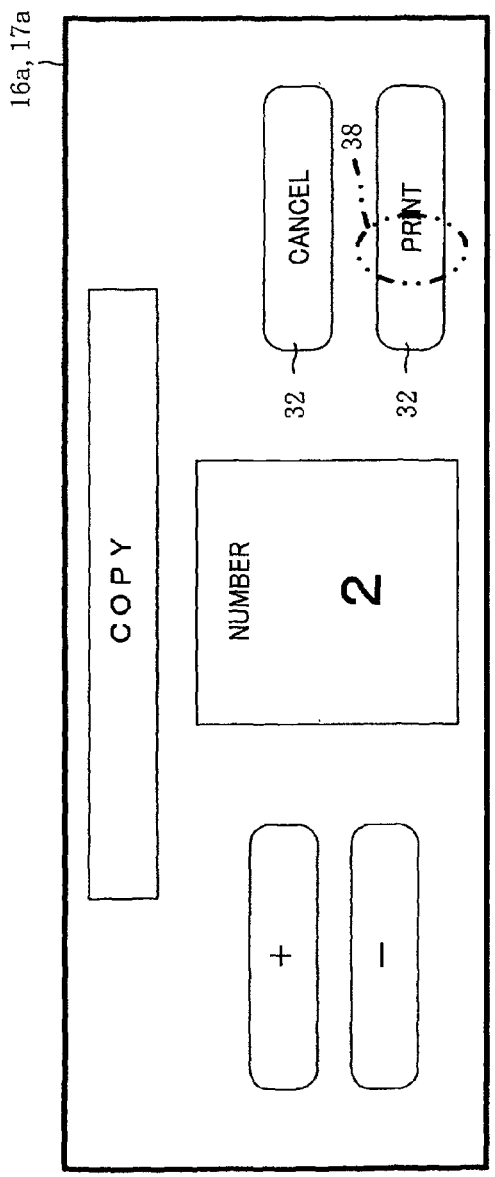
FIG. 4A is a view showing an example of the normal screen.
Figure 4B:
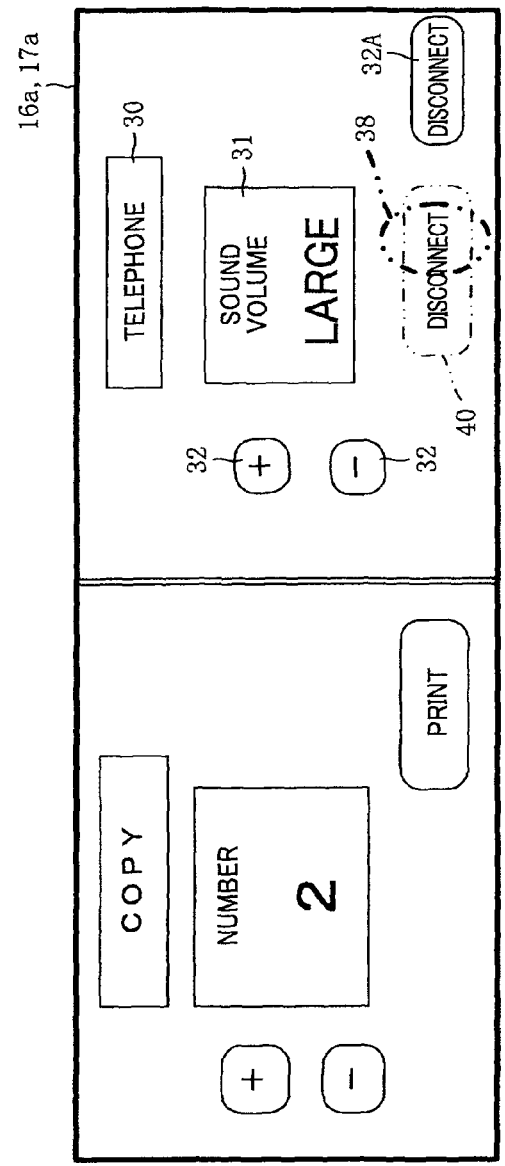
FIG. 4B is a view for explaining an example in a case where a reduced-size image is displayed.

There will be next explained an example in which the images 32 are displayed such that sizes of the respective images 32 are reduced, with reference to FIGS. 4A and 4B. As shown in FIG. 4A, where a new display area having the same area (size) as that of the preset display area 40 of the movement image 32A cannot be assigned to the movement image 32A upon setting of the prohibited area 38, reduced-size images 32 are displayed in the update processing in the present embodiment. To the movement image 32A, a display area having an area (size) smaller than that of the preset display area 40 is assigned. Accordingly, the movement image 32A can be disposed so as to avoid the prohibited area 38, and the images 32 other than the movement image 32A are displayed so as to have smaller sizes, thereby making it possible to give the user less feeling of strangeness in an entirety of the screen. It is noted that the interrupted screen includes two screens in the present embodiment. Thus, the images 32 displayed on only one of the screens on which the movement image 32A is displayed may be displayed so as to have smaller sizes, and as shown in FIG. 4B all the images 32 displayed on the interrupted screen are displayed so as to have smaller sizes.

It is noted that, although not shown in the flow-chart in FIG. 3, the MFP 1 updates the display on the display panel 16a from the interrupted screen to the normal screen after the interruption is finished. Where the preset display areas of the respective images 32 have reduced sizes during the display of the interrupted screen, the preset display areas to be stored into the preset display area table 14a are reset to the preset display areas originally set before the display of the interrupted screen.

In the update processing in the present embodiment, the input operation is expected to be performed after the interrupt request and before the update of the display, the images 32 are arranged so as to avoid a position expected to be designated by the input operation. Thus, for example, even where the display on the display panel 16a has been updated just before the input operation and in a state in which the input object 33 is approaching the display panel 16a, it is possible to prevent the user from erroneously designating or touching the unintended image 32 on the screen after the update of the display. Further, even where the input operation has been successively performed, and the display on the display panel 16a has been updated in a state in which the same image 32 is successively determined as the selected image, it is possible to prevent the user from erroneously designating or touching the unintended image 32 on the screen after the update of the display.

Further, in the update processing in the present embodiment, where the input operation has been performed after the interrupt request and before the update of the display, the images 32 are arranged so as to avoid the position designated by the input operation. Thus, even where it takes a long time beyond expectation of the user to update the display, and thereby the user cannot wait and unthinkingly performs the input operation before the display has been completely changed, the images 32 are displayed so as to avoid the position designated by the input operation on the screen after the update of the display, thereby making it possible to prevent the user from inadvertently designating or touching the unintended image 32.

In view of the above, the CPU 10 can be considered to include a selected image determining section configured to determine the designated image 32 as the selected image, and this selected image determining section can be considered to perform the processing in S328. Further, the CPU 10 can be considered to include a display updating section configured to update the display on the display panel 16a from the normal screen to the interrupted screen where a predetermined display update condition has been satisfied, and this display updating section can be considered to perform the processing in S326. Further, the CPU 10 can be considered to include a position specifying section configured to, where the input operation has been performed or expected to be performed within a period after the display update condition has been satisfied and before the update of the display by the display updating section, specify one of a position designated by the input operation and a position expected to be designated by the input operation, and this position specifying section can be considered to perform the processing in S306.

Further, the CPU 10 can be considered to include a movement image determining section configured to determine, as the movement image 32A, one of the images 32 to be displayed on the interrupted screen on a corresponding one of the preset display areas, the one preset display area including at least a part of the prohibited area 38, and this movement image determining section can be considered to perform the processing in S316. Further, the CPU 10 can be considered to include a display area assigning section configured to assign a new display area to the movement image 32A so as to avoid the prohibited area 38, and this display area assigning section can be considered to perform the processing in S318.

Further, the CPU 10 can be considered to include a first image specifying section configured to specify the image 32 displayed on the prohibited area 38 among the images 32 displayed on the normal screen, and this first image specifying section can be considered to perform the processing in S310. Further, the CPU 10 can be considered to include a second image specifying section configured to specify one of the images 32 to be displayed on the interrupted screen on a corresponding one of the preset display areas, the one preset display area including at least a part of the prohibited area 38, and this second image specifying section can be considered to perform the processing in S312.

Further, the CPU 10 can be considered to include a movement propriety judging section configured to judge whether a display area including no prohibited area 38 and having the same size as the preset display area of the movement image 32A is enabled to be newly assigned to the movement image 32A or not, and this movement propriety judging section can be considered to perform the processing in S320. Further, the CPU 10 can be considered to include an image-size reducing section configured to reduce a size of the image 32 to be displayed on the interrupted screen where the display area including no prohibited area 38 and having the same size as the preset display area of the movement image 32A is disabled to be newly assigned to the movement image 32A, and this image-size reducing section can be considered to perform the processing in S322.

While the embodiment of the present invention has been described above, it is to be understood that the invention is not limited to the details of the illustrated embodiment, but may be embodied with various changes and modifications, which may occur to those skilled in the art, without departing from the spirit and scope of the invention.

Further, in the above-described embodiment, the update of the display means the display on the display panel 16a is changed to the interrupted screen having the split two screens, but the present invention is not limited to this configuration. That is, the update of the display includes a case where at least a part of the display is changed to such an extent that the user can visually recognize the change. For example, a display of an image element such as a pop-up window or a dialog box so as to overlap with an image originally displayed also corresponds to an example of the update of the display.

Figure 5A:
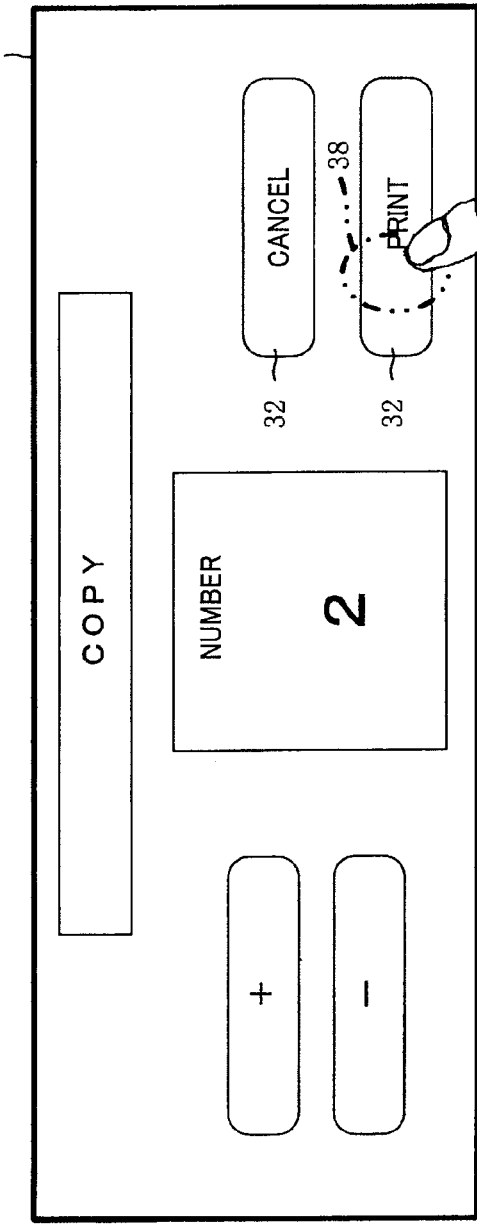
FIG. 5A is a view showing another example of the normal screen.
Figure 5B:
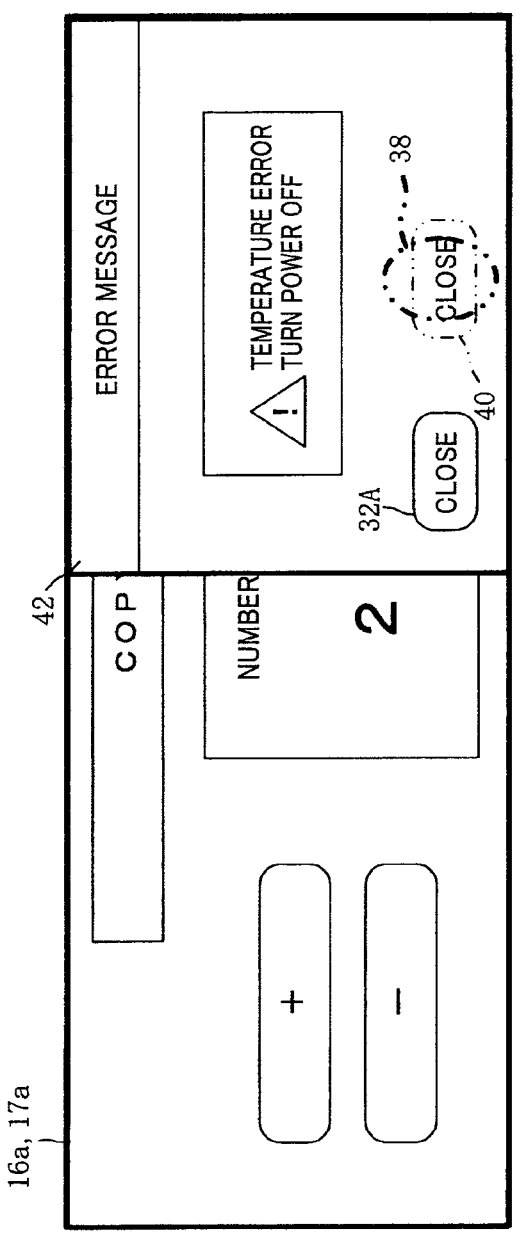
FIG. 5B is a view showing an example in which a dialog box is displayed on the normal screen so as to be overlaid on the normal screen.

FIG. 5A is a view showing another example of the normal screen, and FIG. 5B is a view showing an example in which a dialog box 42 for notifying an error message is displayed on the normal screen so as to be overlaid on the normal screen. As shown in FIG. 5B, this MFP 1 may be configured such that where the preset display area 40 of the image 32 within the dialog box 42 includes the prohibited area 38, the image 32 is displayed so as to avoid the prohibited area 38. Accordingly, even where the dialog box 42 has been displayed just before the user has performed the input operation and the user has performed the input operation without noticing or by excessive motion, for example, it is possible to prevent the user from designating the unintended image 32.

Further, in the above-described embodiment, a single image 32 is determined as the movement image 32A per a single prohibited area 38. However, instead of this configuration, this MFP 1 may be configured such that a plurality of the images 32 are determined as movement images 32A per a single prohibited area 38.

Figure 6A:
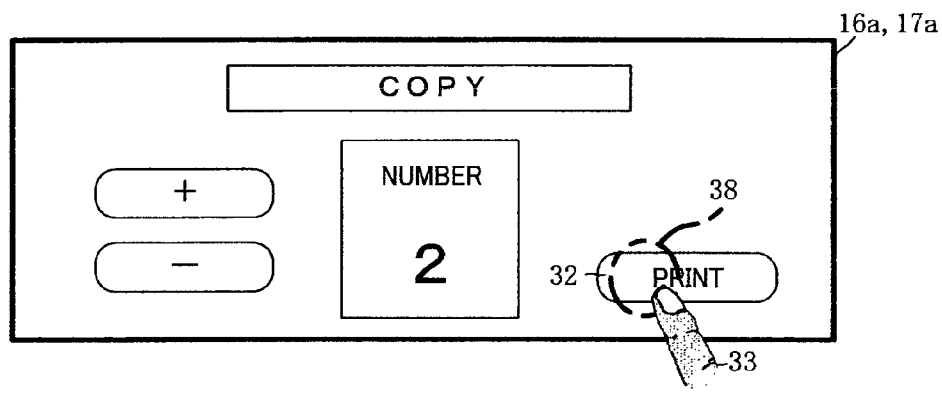
FIG. 6A is a view showing another example of the normal screen.
Figure 6B:
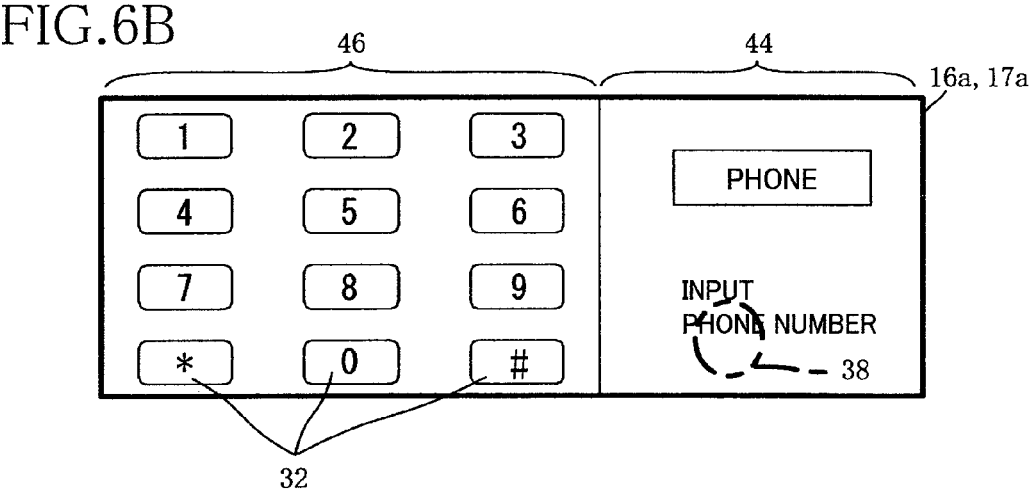
FIGS. 6B and 6C are views each showing an example of a screen in which a function being selected is changed from a copying function to a telephone function.

FIG. 6A is a view showing another example of the normal screen during the copying function being selected, and FIG. 6B is a view showing an example of a screen in which a function being selected is changed from the copying function to the telephone function.

A modification shown in FIGS. 6A and 6B is the same as the above-described embodiment in that the images 32 are arranged so as to avoid the prohibited area 38 on the screen after the update of the display (with reference to FIG. 6B). However, in the modification shown in FIGS. 6A and 6B, the images 32 are not moved individually but a group of images 32 constituting ten keys are moved collectively. For example, as shown in FIG. 6A, where the prohibited area 38 has been set on a right area of the display panel 16a, the right area is set as a display area 44 on which no images 32 are displayed, and a left area of the display panel 16a on which no prohibited area 38 is displayed is set as an image arrangement area 46 on which the images 32 are arranged collectively.

Figure 6C:
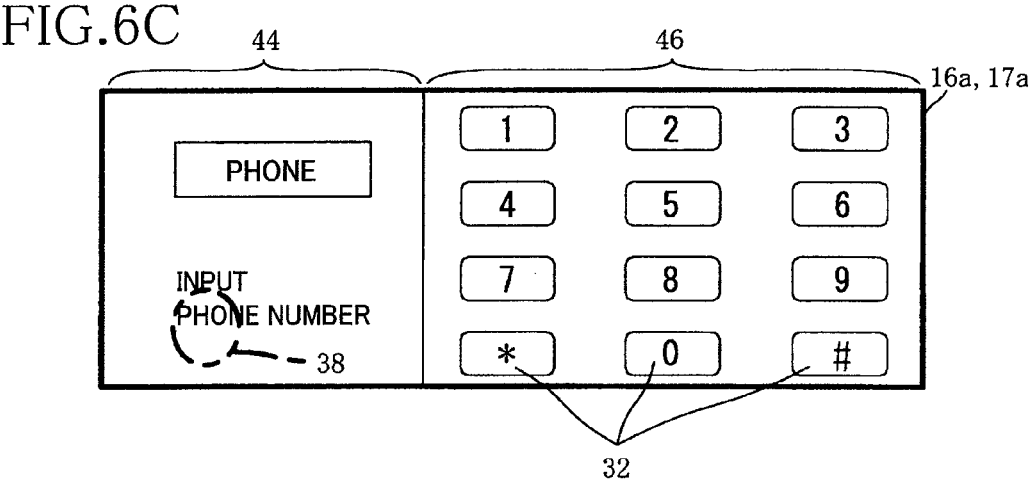

FIG. 6C is a view showing an example of a screen on which the prohibited area 38 has been set on the left area of the display panel 16a. As shown in FIG. 6C, where the prohibited area 38 has been set on the left area of the display panel 16a, the images 32 are collectively arranged on the right area of the display panel 16a contrary to the example shown in FIG. 6B.

Where the MFP 1 is configured in this manner, the images 32 can be arranged so as to avoid the prohibited area 38 while maintaining an arrangement of images 32 as a group such as the images 32 constituting the ten keys, for example.

Further, in the above-described embodiment, the MFP 1 is configured such that the display is updated on the basis of an occurrence of an event unexpected by the user such as an incoming call of a telephone from an external device, but the present invention is not limited to this configuration. For example, the present invention is applicable to a case where the display is updated on the basis of a user's intention such as a case where the user inputs a command for changing or switching the screen.

Further, in the above-described embodiment, the MFP 1 is configured such that the interrupt request of the telephone function has been made while the copying function is being selected. However, the application of the present invention is not limited to this function. That is, the present invention is applicable to any function in a case where an interrupt request of one function has been made while the other function is being selected, such as a case where an interrupt request of a facsimile receiving function has been made while the copying function is being selected, and a case where an interrupt request of the telephone function has been made while the scanning function is being selected.

Further, in the above-described embodiment, the MFP 1 has been explained as an example of an input apparatus, but various devices such as a cellular phone device, an electronic game console, and a digital camera can be used as the inputting apparatus.

Further, the present invention is applicable to a device not equipped with a touch panel. For example, a personal computer (a PC) operated by, e.g., a mouse and a key board may also be an example of the input apparatus.

Figure 7A:
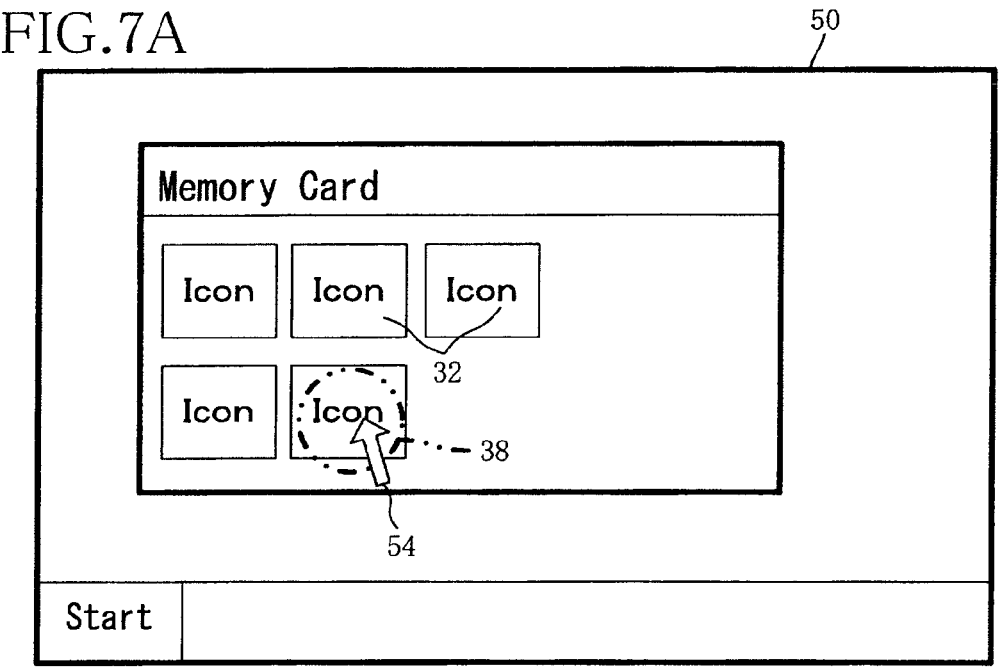
FIG. 7A is a view showing an example of a display panel of a PC as a modification of an input apparatus.
Figure 7B:
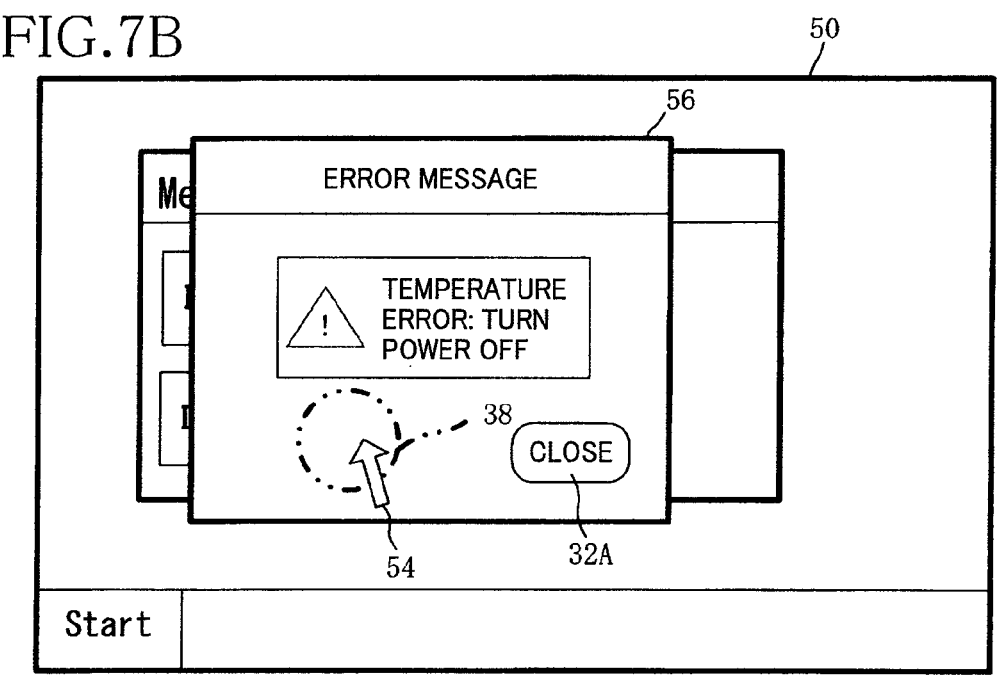
FIG. 7B is a view showing an example in which a dialog box is displayed on a front side of the display panel.

FIGS. 7A and 7B are views showing an example of a display panel 50 of a PC as a modification of the input apparatus. In this modification, icons and operational buttons displayed on the display panel 50 correspond to the images 32. Further, an operation in which a cursor (an indicator) 54 is put on the image 32 and a double-click is performed, and an operation in which an enter key of a key board is pressed with the image 32 being selected correspond to the input operation.

Where the update processing (with reference to FIG. 3) in the above-described embodiment is applied to the modification, the CPU 10 always makes the affirmative decision in S305 (in which the CPU 10 judges whether the input operation has been expected or not) in the update processing in the above-described embodiment. Further, in S306, the CPU 10 preferably specifies a position indicated by the cursor 54 for indicating a position on the display panel 50 as a position expected to be designated by the input operation. Where this MFP 1 is configured in this manner, as shown in FIG. 7A, an area including a position indicated by the cursor 54 is set as the prohibited area 38.

As a result, even where a dialog box 56 is suddenly displayed on a front side, for example, the movement image 32A is displayed so as to avoid a position indicated by the cursor 54. Thus, even where the user has performed, e.g., the double-click without noticing the update of the display or by excessive motion, no images 32 are displayed on a position of the double-click, thereby preventing the user from designating the unintended image 32.

It is noted that also in a case where an operation screen for a certain application has been suddenly displayed on a front side during the user viewing an operation screen for another application and in a case where a pop-up window has been suddenly displayed on a front side during the user viewing a web page, similar effects can be obtained by arranging the images 32 so as to avoid a position indicated by the cursor 54.

Further, in the update processing (with reference to FIG. 3) in the above-described embodiment, the CPU 10 makes the affirmative decision in the judgment in S305 where the input object 33 is approaching the display panel 16a at the time after the CPU 10 has judged that the interrupt request has been made. However, where the MFP 1 is configured such that a result of a detection of the touch panel 17 is stored in a memory for a specific length of time, for example, the MFP 1 may be configured such that the CPU 10 judges in S305 whether or not the input object 33 is approaching the display panel 16a at the time just before the CPU 10 judges that the interrupt request has been made.

Further, the MFP 1 may be configured such that the movement image 32A is displayed on the screen after the update of the display in a manner different from a manner in which the images other than the movement image 32A are displayed. For example, where the movement image 32A is displayed in a different color or where a transparent image 32 is displayed on the preset display area 40 of the movement image 32A (noted that where the transparent image 32 has been designated, a processing assigned thereto is not performed), the user can recognize that the display area of the movement image 32A has been changed from the preset display area 40.

Further, the MFP 1 may be configured to store the images 32 such that the images 32 are classified into first-type images to each of which is assigned a processing for confirming a performance of an operation and a second-type images to each of which is assigned a processing for not accepting the performance of the operation, for example. In a case of the MFP 1 as the above-described embodiment, the first-type images include the images 32 to which are assigned the processings such as performing a recording, starting a conversation, and disconnecting a conversation, for example. On the other hand, the second-type images include the image 32 to which is assigned the processing for changing the set value, for example. Where the user has inadvertently designated the first-type image, a problem arises for the user because the user cannot start the processing from the beginning again, but where the user has inadvertently designated the second-type image, a problem is relatively minor because the user can start the processing from the beginning again.

Thus, a condition in which an image designated by the user is the first-type image may be added as a condition for determining the movement image 32A. Where the MFP 1 is configured in this manner, only the first-type images which may arise a problem where the user has inadvertently designated can be arranged so as to avoid the prohibited area 38.

Further, in the above-described embodiment, the user can freely set the respective preset display areas of the images 32, but the present invention is also applicable to a configuration in which the preset display areas are fixed so as not to be changed by the user.

It is noted that, in the above-described embodiment, the CPU 10 reduces in S322 the size of the preset display area of each image 32 displayed on the interrupted screen, but the present invention is not limited to this configuration. For example, the MFP 1 may be configured such that the CPU 10 reduces a size of a preset display area of at least one of the images 32 displayed on the interrupted screen. Further, the MFP 1 may be configured such that the CPU 10 reduces a size of the preset display area of only the movement image 32A among the images 32 displayed on the interrupted screen and does not change the size of the preset display area of each image 32 other than the movement image 32A displayed on the interrupted screen.

What is claimed is:

1. An input apparatus comprising:
   a display device including a display face on which a first operational screen is displayed, and at least one first operational image is displayed on the first operational screen;
   a position specifying section configured to, when an input operation has been performed or expected to be performed, specify one of the position designated by the input operation and a position expected to be designated by the input operation; and
   a first button-image-determining section configured to determine a first button-image of the at least one first operational image, the first button-image having a first display area including the position which is specified by the position specifying section;
   a second button-image-determining section configured to determine a second button-image displayed within an operational window which is displayed on the first operational screen, the second button-image having a second display area including the position which is specified by the position specifying section, the first display area is overlaid by the second display area; and
   a window displaying section configured to:
      determine whether a first processing and a second processing are the same as each other, the first processing being a processing executed when the input operation is input to the first button-image, the second processing being a processing executed when the input operation is input to the second button-image;
      display, when it is determined that the first processing and the second processing are the same as each other, (a) the operational window at a first window-display area on the first operational screen and (b) the second button-image at the second display area within the operational window, the first window-display area being an area predetermined on the first operational screen, the second display area being an area predetermined within the operational window; and
      display, when it is determined that the first processing and the second processing are different from each other, (a) the operational window at the first window-display area on the first operational screen and (b) the second button-image at a third display area, which is different from the second display area, within the operational window so as to avoid the position specified by the position specifying section;
   a prohibited area setting section configured to set an area including the position specified by the position specifying section as a prohibited area;
   a display area storing portion configured to store therein at least one preset display area, each as the second display area, each of which is a display area set in advance on the display face for a corresponding one of at least one second operational image, each as the second button-image, displayed within the operational window;
   a movement image determining section configured to determine, as a movement image, one of the at least one second operational image to be displayed on the operational window on a corresponding one of the at least preset display area stored in the display area storing portion, the one preset display area corresponding to the movement image including at least a part of the prohibited area set by the prohibited area setting section; and
   a display area assigning section configured to assign a new display area, as the third display area, to the movement image determined by the movement image determining section, so as to avoid the prohibited area,
   wherein the window displaying section is configured to display the second button-image within the operational window so as to avoid the prohibited area set by the prohibited area setting section, and
   wherein the window displaying section is configured to display the movement image on the display area assigned by the display area assigning section.

2. The input apparatus according to claim 1, wherein the window displaying section is configured to display the at least one second operational image each as the second button-image within the operational window such that all of the at least second operational image to be displayed on the second operational window do not overlap with one another.

3. The input apparatus according to claim 1, wherein the display area assigning section is configured to assign a new display area to the movement image such that a positional relationship between the display area newly assigned to the movement image and a display area of the at least one second operational image other than the movement image maintains a positional relationship between a preset display area of the movement image and the display area of the at least one second operational image other than the movement image.

4. The input apparatus according to claim 3, wherein the display area assigning section is configured to assign the new display area to the movement image such that where an upward and downward direction and a rightward and leftward direction are defined on the display face, at least one of (a) an upward-and-downward positional relationship in the upward and downward direction between the display area newly assigned to the movement image and the display area of the at least one second operational image other than the movement image and (b) a rightward-and-leftward positional relationship therebetween in the rightward and leftward direction coincides with at least one of (a) an upward-and-downward positional relationship in the upward and downward direction between the preset display area of the movement image and the display area of the at least one second operational image other than the movement image and (b) a rightward-and-leftward positional relationship therebetween in the rightward and leftward direction.

5. The input apparatus according to claim 1, wherein the window displaying section is configured to display the movement image determined by the movement image determining section in a manner different from a manner in which the at least one second operational image other than the movement image is displayed.

6. The input apparatus according to claim 1, further comprising:
a movement propriety judging section configured to judge whether or not a display area including no prohibited area and having the same size as the preset display area of the movement image stored in the display area storing portion is enabled to be newly assigned to the movement image determined by the movement image determining section; and
an image-size reducing section configured to reduce a size of the movement image to be displayed on the operational window where the movement propriety judging section has judged that the display area including no prohibited area and having the same size as the preset display area of the movement image is disabled to be newly assigned to the movement image.

7. The input apparatus according to claim 6,
wherein the image-size reducing section is configured to reduce a size of the movement image determined by the movement image determining section, and
wherein the display area assigning section is configured to assign the new display area not overlapping with the prohibited area, to the movement image whose image size has been reduced by the image-size reducing section.

8. The input apparatus according to claim 1, further comprising a detecting device configured to detect an approach of an input object toward the display face,
wherein the position specifying section is configured to specify a position at which the approach of the input object has been detected by the detecting device, as the position expected to be designated by the input operation.

9. The input apparatus according to claim 1, further comprising a detecting device configured to detect a touch of an input object on the display face,
wherein the position specifying section is configured to specify a position at which the touch of the input object has been detected by the detecting device, as the position designated by the input operation.

10. The input apparatus according to claim 1, wherein where the same operational image is successively determined as the first button-image by successive input operations, the position specifying section is configured to specify a position designated by one of the successive input operations that has been most recently performed, as the position expected to be designated by the input operation.

11. The input apparatus according to claim 10, wherein where one of the successive input operations on the first button-image and a next one of the successive input operations on the second button-image have been performed within a successive designation period, the position specifying section is configured to judge that successive designations have been performed and specify the position expected to be designated by the input operation.

12. The input apparatus according to claim 1, wherein the position specifying section is configured to specify a position indicated by an indicator displayed on the display face to indicate a position on the display face, as the position expected to be designated by the input operation.

13. A non-transitory storage medium storing an input control program executed by a computer of an inputting apparatus, the input control program comprising:
displaying at least one first operational image on a first operational screen;
specifying, when an input operation has been performed or expected to be performed, one of a position designated by the input operation and a position expected to be designated by the input operation;
determining a first button-image of the at least one first operational image, the first button-image having a first display area including the specified position;
determining a second button-image displayed within an operational window which is displayed on the first operational screen, the second button-image having a second display area including the specified position, the first display area is overlaid by the second display area; and
determining whether a first processing and a second processing are the same as each other, the first processing being a processing executed when the input operation is input to the first button-image, the second processing being a processing executed when the input operation is input to the second button-image;
displaying, when it is determined that the first processing and the second processing are the same as each other, (a) the operational window at a first window-display area on the first operational screen and (b) the second button-image at the second display area within the operational window, the first-window area being an area predetermined on the first operational screen, the second display area being an area predetermined within the operational window;
displaying, when it is determined that the first processing and the second processing are different from each other, (a) the operational window at the first window-display area on the first operational screen and (b) the second button-image at a third display area, which is different from the second display area, within the operational window so as to avoid the specified position;
setting an area including the position specified as a prohibited area;
displaying the second button-image within the operational window so as to avoid the set prohibited area;
storing at least one preset display area, each as the second display area, each of which is a display area set in advance on the display face for a corresponding one of at least one second operational image, each as the second button-image, displayed within the operational window;

determining, as a movement image, one of the at least one second operational image to be displayed on the operational window on a corresponding one of the stored at least one preset display area, the one preset display area corresponding to the movement image including at least a part of the set prohibited area;

assigning a new display area, as the third display area, to the determined movement image, so as to avoid the set prohibited area;

displaying the second button-image within the operational window so as to avoid the set prohibited area; and displaying the movement image on the assigned display area.

* * * * *